Nov. 15, 1960  R. H. BILLS  2,960,018
DOUBLE TURRET MOUNTING FOR ARCHITECTURAL
VIEW CAMERA AND MULTIPLE LENSES
Filed Oct. 17, 1957  4 Sheets-Sheet 2

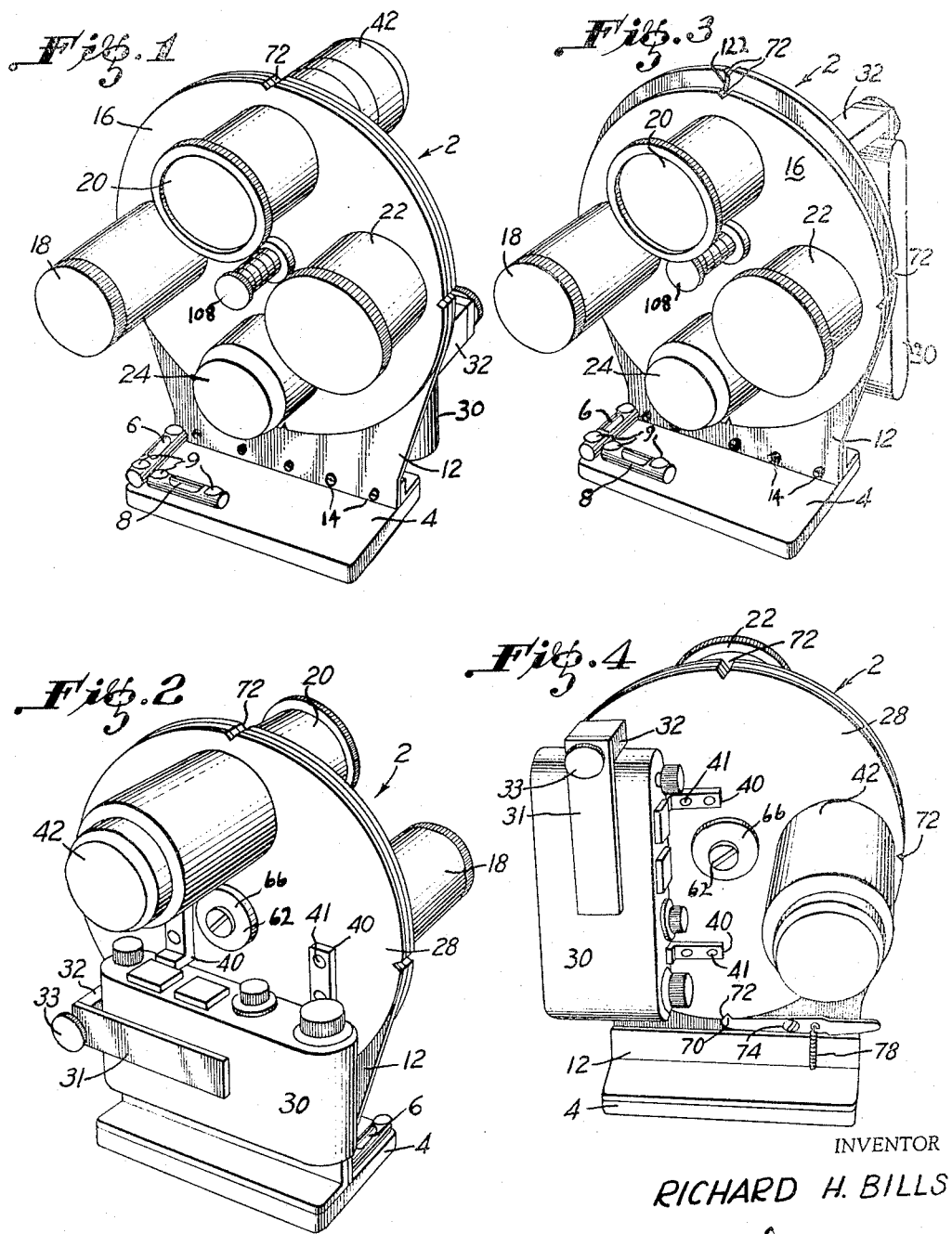

INVENTOR
RICHARD H. BILLS

BY James H Littlepage
ATTORNEY

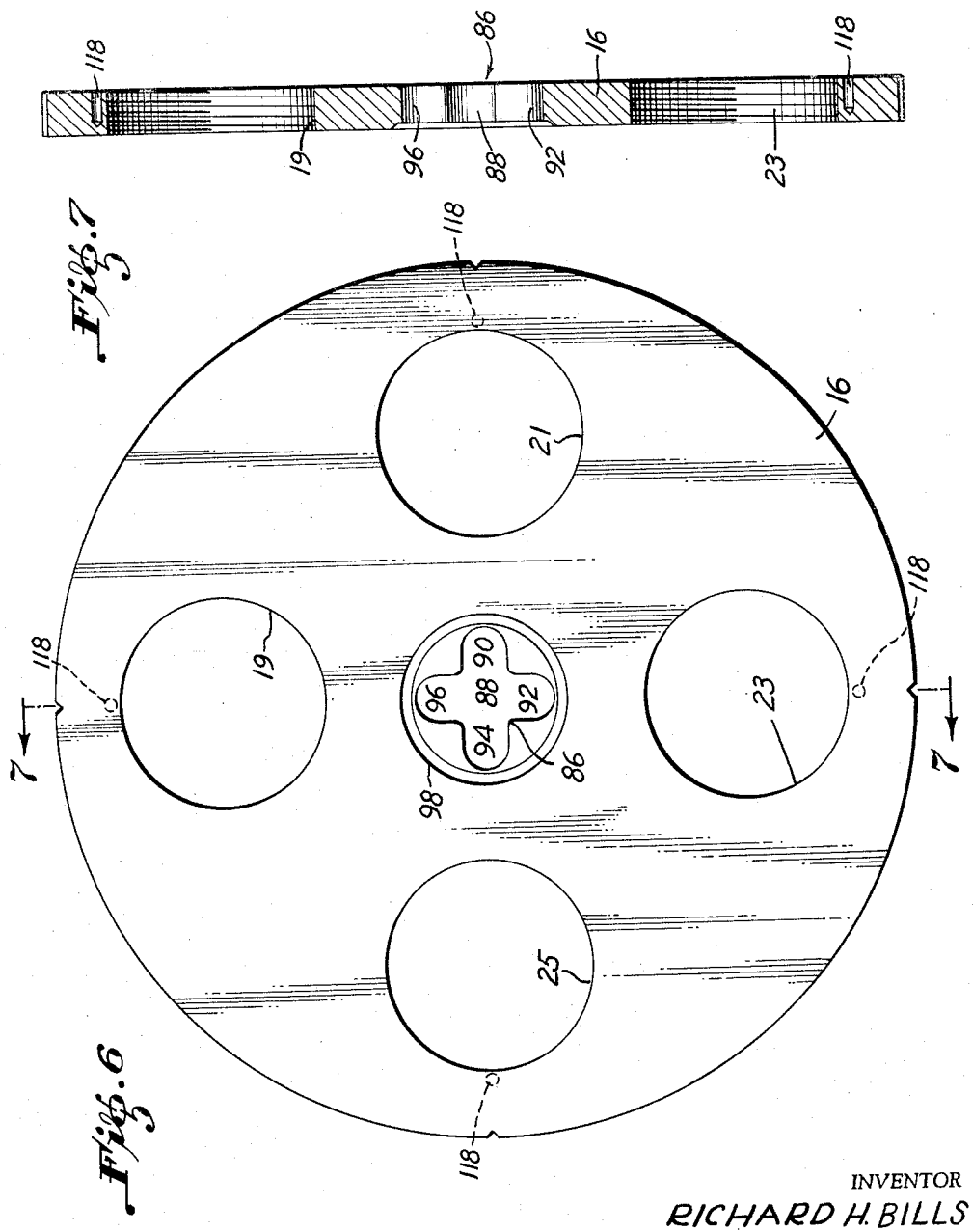

Nov. 15, 1960 R. H. BILLS 2,960,018
DOUBLE TURRET MOUNTING FOR ARCHITECTURAL
VIEW CAMERA AND MULTIPLE LENSES
Filed Oct. 17, 1957 4 Sheets-Sheet 4

INVENTOR
RICHARD H. BILLS
BY James H. Littlepage
ATTORNEY

United States Patent Office 2,960,018
Patented Nov. 15, 1960

2,960,018

DOUBLE TURRET MOUNTING FOR ARCHITECTURAL VIEW CAMERA AND MULTIPLE LENSES

Richard H. Bills, Rte. 5, West Bend, Wis.

Filed Oct. 17, 1957, Ser. No. 690,729

8 Claims. (Cl. 95—44)

This invention relates to photographic apparatus and, more particularly, to a double turret mounting for an architectural view camera and multiple lenses.

One object of this invention is to provide a double turret mounting for a camera and lenses providing for the selective positioning, either horizontally or vertically, of a camera and an associated viewing lens and further providing, on the other hand, for the selective positioning of any one of a plurality of camera lenses in front of the camera. Thus in the vertical dimension a subject picture can be made to extend either lengthwise or transversely of the film in the camera by corresponding orientation of the camera and, with either orientation of the camera any one of a plurality of lenses may be utilized.

The primary object of the invention is to provide a turret mounting for lenses whereby a selected lens, disposed in front of the camea in picture-taking position, may be adjusted from side to side or upwardly and downwardly with respect to the camera so as to alter the composition of the resultant picture. Thus, by raising a lens upwardly, for instance, matter in the lower foreground of a picture may be eliminated while simultaneously taking in more of the field above the subject. A great advantage of the composition adjustment obtained in accordance with the invention is that the camera and lenses may be maintained level at all times, whereas, to obtain the same composition by tilting the camera upwardly or downwardly, the picture would be distorted.

More specifically, the object now is to provide a double turret mounting wherein a camera and an associated viewing lens are mounted on a camera turret rotatably supported on the rear side of a central, fixed supporting plate. Preferably, the viewing lens is disposed on the camera turret 180° from the camera, and with its focal plane substantially co-planar with the focal plane of the camera. A plurality of lenses are disposed, preferably at equal angular intervals, such as 90° apart, on a lens turret rotatably mounted in front of the central supporting plate, the lens turret normally being coaxial with the camera turret, but with provision made in the mounting of the lens turret so that the latter may be shifted off center, from side to side or vertically, to vary the picture composition.

These and other objects will be apparent from the following specifications and drawings, in which:

Fig. 1 is a front perspective view of the assembly, with the camera turret adjusted to dispose the camera supported thereon in readiness to take a picture in a lower horizontal position;

Fig. 2 is a rear perspective view of the assembly as shown in Fig. 1;

Fig. 3 is a front perspective view, similar to Fig. 1, but showing the lens turret adjusted downwardly;

Fig. 4 is a rear perspective view, similar to Fig. 2, but showing the camera turret adjusted to dispose the viewing screen in a position so that when the camera turret is subsequently rotated 180° to replace the viewing screen with the camera, the latter will be oriented vertically.

Fig. 6 is a front plane view of the lens turret plate;

Fig. 7 is a cross section along the line 7—7 of Fig. 6; and,

Figure 5:
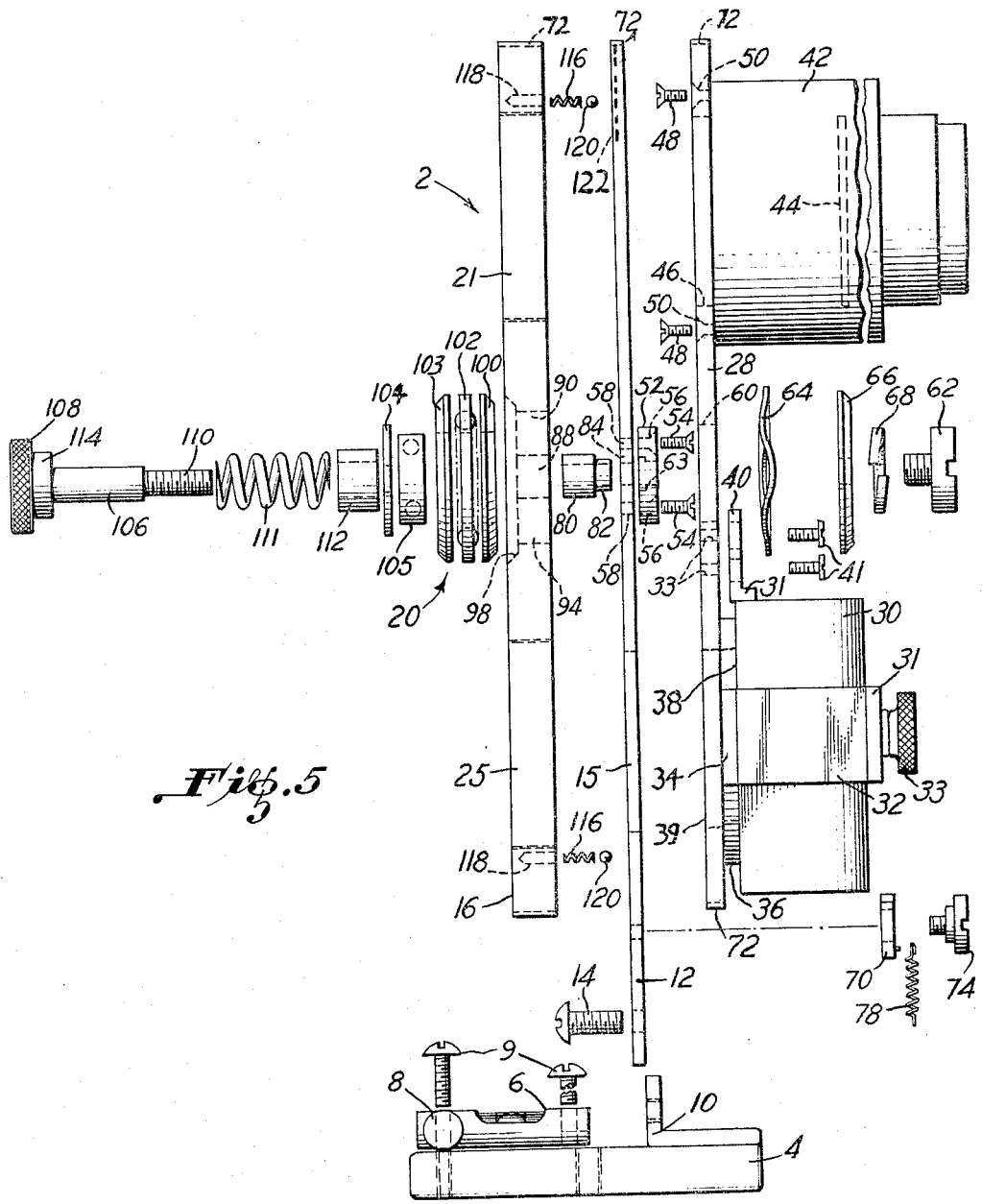
Fig. 5 is an exploded view of the parts of the assembly.
Figure 8:
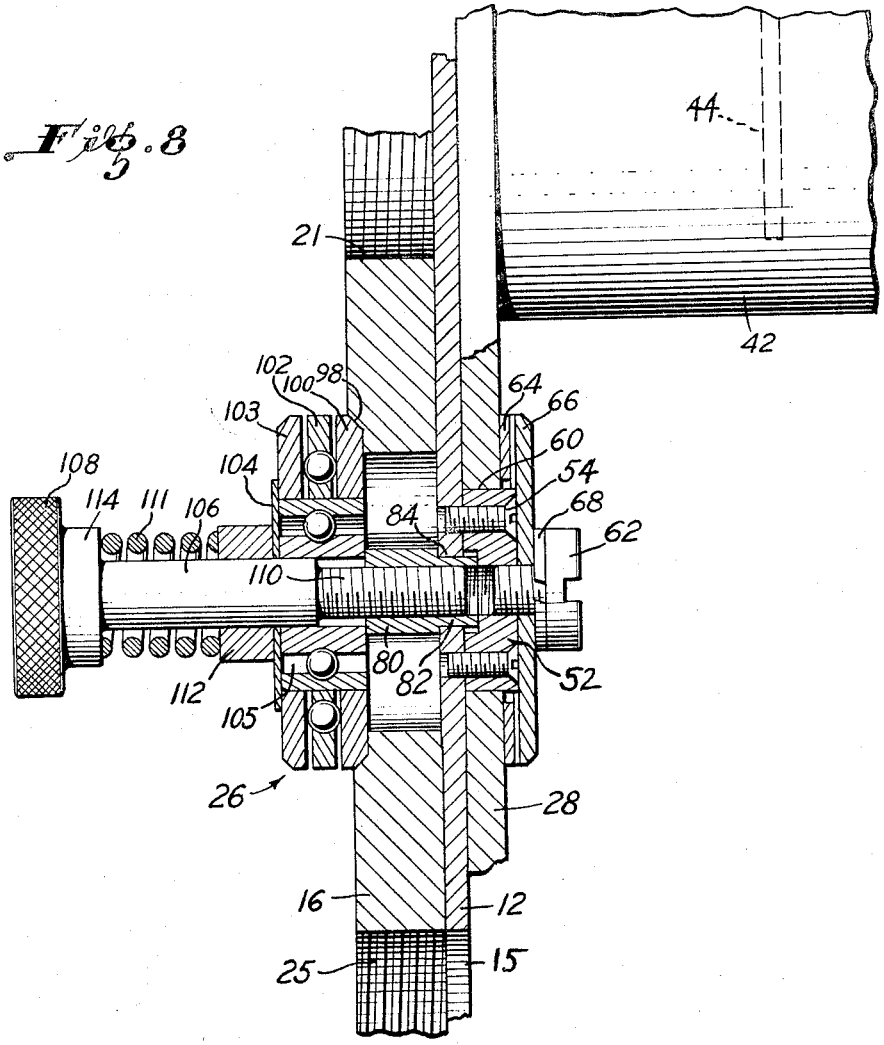
Fig. 8 is an enlarged fragmentary cross section through the middle of the assembly.

Referring now to the drawings in which like reference numerals denote similar elements, the double turret mounting 2 is supported on a base 4 having cross levels 6 and 8 suitably secure, as by screws 9. Base 4 is provided with suitable means (not shown) for mounting the base on a tripod, and the base is provided with a bracket 10 in which the fixed, upstanding central plate 12 of the double turret mounting is secured by screws 14. Central plate 12 has two openings 15 spaced 90° apart, one opening 15 being on the three-o'clock radius of the central plate as seen from the back, and the other opening being on the six-o'clock radius.

Rotatably mounted on the front side of central plate 12 is a lens turret 16, a circular plate having different lenses 18, 20, 22 and 24 threadedly engaged in openings 19, 21, 23 and 25 respectively, arranged 90° apart. The lens turret 16 and its associated lenses are vertically and horizontally adjustable and rotatably mounted on a central bearing assembly 26 detailed hereinbelow.

On the rear side of central plate 12 is rotatably mounted a camera turret 28, which supports a camera 30 held thereon by clamp bar 31 held on the outer end of a bracket arm 32 by a thumb screw 33. Bracket arm 32 is mounted on camera turret 28 by means of a base plate 34 having on its radially inner end an enlargement 36 with a socket opening 38 into which the lens mounting ring on the front of the camera engages. An enlarged opening 39 is provided through camera turret 28 in front of the lens opening for the camera. Lugs 40 held on camera turret 28 by screws 41 provide positioning abutments for the camera. Various camera mountings may be provided to accommodate the particular size and shape camera employed.

A viewing device 42, preferably having its focal plane diagrammatically indicated at 44 substantially in the focal plane of camera 30, is mounted on camera turret 28 180° from camera 30, viewing device 42 being disposed behind an opening 46 in camera turret 28 and held on by screws 48 engaging through counter-sunk screw holes 50 in the camera turret 28.

Camera turret 28 is rotatably supported on central plate 12 by a camera turret bearing 52 mounted, in the manner of a boss, on the rear side of the central plate by means of screws 54 which extend through countersunk openings 56 in the camera turret bearing and threadedly engage in screw holes 58 in fixed plate 12. Camera turret bearing 52 is closely surrounded by the circular periphery of a bearing opening 60. A mounting screw 62 engages in threads 63 in camera turret bearing 52, and a warped compression spring washer 64 is engaged between the washer 66, against which the head of mounting screw 62 presses through a lock washer 68. Thus, camera turret 28 is rotatable on camera turret bearing 52, and is snugly held against central plate 12 by means of compression spring 64 and associated screw 62 and washers 66 and 68. Camera turret 28 is rotatable through the 360°, and held in selected one of four 90° positions by a lock arm 70 engaging in a selected one of notches 72 arranged around the periphery of camera turret 28. Lock arm 70 is mounted on the rear side of central plate 12 by a shouldered screw 74 which engages in a suitable screw aperture in the fixed plate, the lock arm being normally biased towards notch engaging position by means of a spring 78.

The central turret bearing assembly 26 for lens turret 16 includes a lens turret mounting stud 80 having a reduced end 82 staked into a central opening 84 in central plate 12. Mounting stud 80, having internal threads 82, extends forwardly from central plate 12 and lies within a cruciform central opening 86 in lens turret 16. Cruciform opening 86 has a central passage 88 and four branches 90, 92, 94 and 96 radiating at 90° intervals. Normally stud 80 is centered in central passage 88, but it may also be accommodated in any one of branches 90—96. A chamfered recess 98 surrounding cruciform central opening 86 normally centers a chamfered washer 100 on the rear side of a ball bearing assembly 102 which has a second washer 103 on its front against which engages thrust washer 104. A central ball bearing assembly 105 is engaged between ball bearing assembly 102, washers 100 and 103, and the smooth shank portion 106 of thumb screw 108 whose threaded inner end 110 threadedly engages with the internal threads 82 on stud 80. The central bearing assembly 26 is tensioned by a compression spring 111, which engages, at one end, against a thrust collar 112 abutting thrust washer 104 and, at the other end, against a shoulder 114 on thumb screw 108. Lens turret 16 is freely rotatable around mounting stud 80, but yieldably held in a selected one of four 90° positions by means of compression springs 116 which engage in spring seats 118 in lens turret 16 and press balls 120 into grooves 122 in the front face of central plate 12. Grooves 122 in central plate 12 are spaced 90° apart so that balls 20 snap into them with each 90° of rotation of lens turret 16, when lenses 18—24 come into position before the openings 15 in fixed plate 12.

So long as bearing washer 100 is seated in chamfered recess 98, lens turret 16 is coaxially disposed with respect to central plate 15 and camera turret 28. However, by loosening thumb screw 108 lens turret 16 may be moved upwardly or downwardly or from one side to the other so that mounting stud 80 then engages through one of branches 90—96 of cruciform central opening 86.

In operation, lock arm 70 is released from one of notches 72 and camera turret 28 is rotated so as to place viewing device 42 in the six-o'clock position (for horizontal orientation of the ultimate picture) or in the three-o'clock position shown in Fig. 4 for vertical orientation. Lock arm 70 then snaps into the notch 72 most proximate thereto. The object to be photographed is viewed through viewing device 42 and, if desired, lens turret 16 may be rotated so that the object can first be viewed through various lenses. As the object is viewed through the selected lens, the lens is focused. If, while viewing and focusing the object, it is decided to shift the field vertically or horizontally, adjusting screw 108 may be loosened and lens turret 16 may be shifted bodily, either vertically or horizontally, correspondingly to shift the field.

The invention is not limited to the details described and illustrated hereinbefore, but is intended to cover all substitutions, modifications and equivalents within the scope of the following claims.

I claim:

1. A camera device comprising, in combination, a fixed plate having front and rear sides, means for supporting said fixed plate in a substantially vertical plane, said fixed plate having at least one aperture therethrough, a camera support member on the rear side of said fixed plate, a camera on said support member and having an opening disposed in registry with said aperture, a lens turret plate on the front side of said fixed plate, a plurality of lenses on said turret plate, and shiftable pivot means rotatably mounting said turret plate on the front side of the fixed plate, said shiftable pivot means comprising a forwardly projecting stud on said fixed plate, said turret plate having a substantially cruciform slot therethrough engaging around said stud, the central and cross portions of said slot slidably accommodating said stud, and means including a compression spring engaged between the forward end of the stud and the turret plate yieldably retaining said turret plate on said stud, whereby the field of the picture focused by a lens on said turret plate may be shifted by sliding the turret plate relative to the stud.

2. A camera device comprising, in combination, a base, an upstanding fixed plate on said base, said fixed plate being normally disposed in a substantially vertical plane, central bearing means on said fixed plate, said fixed plate having first and second openings therethrough spaced respectively vertically and horizontally from said bearing means and disposed 90° from one another at substantially equal radial distances from said central bearing means, a first movable plate rotatably supported on said bearing means closely adjacent one side of said fixed plate, a camera and a viewing device angularly spaced from one another on said first movable plate, said camera and said viewing device being disposed generally at said equal radial distances from said bearing means and being alternately disposable in substantial registry with either of said openings, a second movable plate rotatably supported on said central bearing means on the other side of said plate, and a plurality of lenses on said second movable plate, said lenses being disposed generally at said equal radial distances from said central bearing means whereby said lenses may selectively be disposed in substantial registry with either of said openings.

3. The combination claimed in claim 2, and a pair of indexing means respectively engaged between said fixed and movable plates for facilitating registry of said camera, viewing device and the selected lens with a selected one of said openings.

4. The combination claimed in claim 2, and means for adjusting one of said movable plates with respect to said bearing means in at least one direction parallel with the plane of said fixed plate, whereby correspondingly to shift the field of the image focused by the selected lens while maintaining said plates in a substantially vertical plane.

5. The combination claimed in claim 2, one of said plates having a substantially cruciform slot therein engaging around said bearing means, whereby the axis of rotation of said one plate may selectively be shifted in transverse directions parallel with the plane of the fixed plate by selectively engaging one of the arms of said slot or the center thereof with said bearing means.

6. The combination claimed in claim 5, and manually operable means associated with said central bearing means and said cruciform slot for releasably maintaining the central bearing means in the selected portion of the cruciform slot.

7. A camera device comprising, in combination, a base, an upstanding fixed plate on said base, said fixed plate being normally disposed in a substantially vertical plane, rotary bearing means on said fixed plate, said fixed plate having first and second openings thereon spaced respectively vertically and horizontally from said rotary bearing and disposed on a circle 90° from one another at substantially equal radial distances from said rotary bearing means, a first turret plate rotatably supported on said rotary bearing means closely adjacent one side of said fixed plate, camera means mounted on said first turret plate and being selectively registerable with either of said openings upon rotation of said first turret plate, a second turret plate closely adjacent the other side of said fixed plate, said second turret plate having a plurality of lens openings therethrough disposed in a circle having a radius similar to the circle on which the openings in said fixed plate are disposed, a plurality of lenses respectively mounted in said lens openings, means mounting said second turret plate on said rotary bearing means whereby said second turret plate may be rotated selectively to bring said lenses into registry with either of the openings in said fixed plate, the last-named means being adjustable to provide limited horizontal and vertical shifting of said second turret plate with respect to said fixed plate whereby correspondingly to shift the view of said camera means.

8. A camera device comprising, in combination, a base, an upstanding fixed plate on said base, said fixed plate being normally disposed in a substantially vertical plane, rotary bearing means on said fixed plate, said fixed plate having first and second openings thereon spaced respectively vertically and horizontally from said rotary bearing and disposed on a circle 90° from one another at substantially equal radial distances from said rotary bearing means, a first turret plate rotatably supported on said rotary bearing means closely adjacent one side of said fixed plate, camera means mounted on said first turret plate and being selectively registerable with either of said openings upon rotation of said first turret plate, a second turret plate closely adjacent the other side of said fixed plate, said second turret plate having a plurality of lens openings therethrough disposed in a circle having a radius similar to the circle on which the openings in said fixed plate are disposed, a plurality of lenses respectively mounted in said lens openings, and means mounting said second turret plate on said rotary bearing means whereby said second turret plate may be rotated selectively to bring said lenses into registry with either of the openings in said fixed plate.

References Cited in the file of this patent

UNITED STATES PATENTS

| | | |
|---|---|---|
| 1,210,896 | Brown | Jan. 2, 1917 |
| 1,297,704 | Leonard | Mar. 18, 1919 |
| 1,568,671 | Hutchings | Jan. 5, 1926 |
| 1,637,529 | Mitchell | Aug. 2, 1927 |
| 1,884,169 | Owens | Oct. 25, 1932 |
| 1,914,874 | Walton | June 20, 1933 |
| 2,283,077 | Maurer | May 12, 1942 |